(12) United States Patent
Lewinson et al.

(10) Patent No.: US 9,571,429 B2
(45) Date of Patent: Feb. 14, 2017

(54) METHODS AND SYSTEMS FOR DELAYED NOTIFICATIONS IN COMMUNICATIONS NETWORKS

(71) Applicant: RideShark Corporation, Ottawa (CA)

(72) Inventors: Tom Henrik Lewinson, Ottawa (CA); Sharon Elizabeth Lewinson, Ottawa (CA)

(73) Assignee: RIDESHARK CORPORATION, Ottawa (CA)

(*) Notice: Subject to any disclaimer, the term of this patent is extended or adjusted under 35 U.S.C. 154(b) by 338 days.

(21) Appl. No.: 14/010,793

(22) Filed: Aug. 27, 2013

(65) Prior Publication Data
US 2014/0067974 A1 Mar. 6, 2014

Related U.S. Application Data

(60) Provisional application No. 61/694,325, filed on Aug. 29, 2012.

(51) Int. Cl.
| | |
|---|---|
| *G06F 15/16* | (2006.01) |
| *H04L 12/58* | (2006.01) |
| *H04L 12/18* | (2006.01) |

(52) U.S. Cl.
CPC .......... *H04L 51/04* (2013.01); *H04L 12/189* (2013.01); *H04L 12/1859* (2013.01); *H04L 12/581* (2013.01); *H04L 12/5885* (2013.01); *H04L 51/00* (2013.01); *H04L 51/30* (2013.01); *H04L 51/34* (2013.01); *H04L 51/14* (2013.01)

(58) Field of Classification Search
CPC .......... H04L 51/00; H04L 51/08; H04L 51/16; H04L 51/14; H04L 51/24; H04L 51/063; H04L 12/189; H04L 12/581; H04L 12/5885; H04L 12/1859; H04L 67/18

See application file for complete search history.

(56) References Cited

U.S. PATENT DOCUMENTS

| | | | |
|---|---|---|---|
| 7,924,844 B1 * | 4/2011 | Defrang | .............. H04L 12/5875 370/394 |
| 2009/0285129 A1 | 11/2009 | Swanburg et al. | |

(Continued)

*Primary Examiner* — Chirag R Patel
*Assistant Examiner* — Rachel J Hackenberg
(74) *Attorney, Agent, or Firm* — The Law Office of Michael E. Kondoudis

(57) ABSTRACT

Communications is the exchange of thoughts, messages, or information. However, whilst immense investments into evolving communications infrastructure supporting multiple communications channels have been made the vast majority of communications models, standards, and developments focus to the transmission of the message as a single process with other aspects of the communications channel are considered simply delays in the communications channel. However, it would be beneficial to provide enhancements to such communications channels to provide additional information to the sender with respect to the delivery to and recovery by the recipient of the message such that not only do they have the option to elect to receive a delivery notification in communications systems that today do not provide such information, but that in these systems and those supporting delivery notifications increased information is provided to the user allowing them to ascertain or estimate the recipient's absorption/reading of the message.

19 Claims, 11 Drawing Sheets

(56) References Cited

U.S. PATENT DOCUMENTS

2012/0033794 A1 2/2012 Jackson et al.
2014/0310365 A1* 10/2014 Sample .................. H04L 51/16
　　　　　　　　　　　　　　　　　　　　　　　709/206

* cited by examiner

METHODS AND SYSTEMS FOR DELAYED NOTIFICATIONS IN COMMUNICATIONS NETWORKS

CROSS-REFERENCE TO RELATED APPLICATIONS

This patent application claims the benefit of U.S. Provisional Patent Application 61/694,325 filed on Aug. 29, 2012 entitled "Methods and Systems for Delayed Notifications in Communications Networks."

FIELD OF THE INVENTION

The present invention relates to communications systems and more particularly delayed notifications and enhanced sender feedback.

BACKGROUND OF THE INVENTION

Communication is the exchange of thoughts, messages, or information, as by speech, visuals, signals, writing, or behavior. As such communication requires a sender, a message, and a recipient, although the receiver does need not be present or aware of the sender's intent to communicate at the time of communication and therefore communication can occur across wide ranges of distances in both time and space. Typically communication requires that the communicating parties share an area of communicative commonality and a communication process is typically considered complete once the receiver has understood the message of the sender.

The first major model of communication, see Shannon et al in "The Mathematical Theory of Communication" (University of Illinois Press, 1949) consisted of three primary parts, namely sender, channel, and receiver. In a simple model, often referred to as the transmission model or standard view of communication, information or content (e.g. a message in a natural language) is sent in some form (e.g. as spoken language) from a source/sender/encoder to a destination/receiver/decoder. This common conception of communication simply views communication as a means of sending and receiving information and according to Shannon is based on the following elements:

- an information source, which produces a message;
- a transmitter, which encodes the message into signals;
- a channel, to which signals are adapted for transmission;
- a receiver, which decodes (reconstructs) the message from the signal; and
- a destination, where the message arrives.

This model was expanded by Berlo et al into the Sender-Message-Channel-Receiver (SMCR) Model of Communication, see for example "The Process of Communication" (Rinehart & Winston Press, New York, 1960) which separated the communication model into clear parts and has been expanded upon by other scholars. Accordingly, such models allow one-way, two-way, and multi-way conversations to be modeled, analysed and implemented within telecommunications infrastructure across multiple communications technologies to perform the transmitter, channel, and receiver such as wireless, wired, and fiber optic. Such models also support multiple communication formats including, for example, voice, either through Plain Old Telephone Service (POTS) or Voice-over-Internet Protocol (VOIP), as a general two-way communication process, electronic mail, commonly referred to as email and generalized into one-way communications, and Short Message Service, commonly referred to as SMS or text and similarly generalized into a one-way communication. Accordingly, communications common today such as "Tweeting" on the social media network Twitter™ and concepts such as "email threads" and Instant Messaging are merely concatenations of multiple discrete email and SMS one-way communications. "Tweeting" and email provide multicast communications wherein the message is communicated to a plurality of recipients simultaneously in a single transmission from the source wherein copies of the message are automatically created in other network elements, such as routers, but only when the topology of the network requires it.

However, these models and the consideration of the interactions between sender and recipient is that the message is sent by the sender and received by the recipient as a single process and that other aspects of the communications channel such as voicemail, email server, and text server that store the senders message prior to the recipients receipt are modeled as a delay within the communications channel. However, going back to the primary definition of communication is the exchange of thoughts, messages, or information and accordingly these models and their physical implementations do not provide for verification that the exchange has occurred in the manner the sender intended unless for example the voice communication is a two-way session or a subsequent one-way communication from the recipient referencing the original one-way communication or its content is received by the sender.

According, whilst voicemail's introduction enabled people to leave lengthy, secure and detailed messages in natural voice, working hand-in-hand with corporate and personal phone systems it also broke the two-way communication session methodology of telephony prior to its introduction. This is further compounded by there being two main modes of voicemail operation, namely telephone answering and voice messaging. Telephone answering voicemail answers outside calls and takes a message from any outside caller, either because the extension was busy or rang with no-answer, or voice messaging which enables any subscriber with a mailbox number to send messages directly to any or many subscribers' mailboxes without first calling them. Accordingly, the sender is unable to determine whether the recipient has listened to the message, deleted it unheard, or stopped listening part way through the voicemail. With the rapid uptake of portable electronic devices (PEDs) many individuals now have three or more telephone numbers, for example home, cellphone, and work, thereby increasing the complexity of ensuring a message is delivered to a recipient, yet alone played and understood.

These issues have continued into email and SMS/text communications in the last thirty years as these systems have proliferated. With the adoption of email into business activities and its replacement of physical mail delivery which provided options for delivery verification such as from the mail delivery organization itself or through a signature of the recipient the absence of verification presented an issue. Accordingly, some email systems such as Microsoft™ Outlook introduced email to provide a digitally time-stamped record to reveal the exact time and date that an email was received and/or opened according to the settings established by the sender. However, due to the nature of the technology, email tracking cannot be considered an absolutely accurate indicator that a message was opened or read by the recipient. Even receiving a reply referencing the original email does not address whether the recipient read the content.

Likewise within SMS/text systems the vast majority of such systems, commonly referred to as Instant Messaging (IM) systems, present the same issues of whether the recipient received and read the text message. Accordingly, in these systems the receipt of a reply from the recipient may provide some indication that they received or read the message but their reply could be a coincidence. One notable exception to this is Research in Motion's Blackberry™ Messenger service which provides a delivery notification on the sender's messaging interface and a read notification when the recipient opens the message. However, this service is feasible as the entire messaging system is routed through Research in Motion's own messaging servers.

In many instances the sender whilst wishing to send the recipient a message does not wish to send the message at the time they decide to do so as they do not wish to disturb the recipient or potentially disturb the recipient. For example, the sender may need to send a message to the recipient at 10 pm in the evening at their home but does not want to disturb the recipient and their family at home. Accordingly, the sender may decide not to send the message at that time and to do so in the morning wherein they may forget or miss the recipient. Alternatively they may elect to use another form of communications, such as email, which is not delivered to the recipient due to a network issue or is not seen or opened by the recipient.

Accordingly it would be beneficial to provide enhancements to voicemail, email, SMS and other communications that provide additional information to the sender with respect to the delivery to and recovery by the recipient of the message such that not only do they have the option to elect to receive a delivery notification in communications systems that today do not provide such information, but that in these systems and those supporting delivery notifications increased information is provided to the user allowing them to ascertain or estimate the recipient's absorption/reading of the message.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to communications systems and more particularly delayed notifications and enhanced sender feedback.

In accordance with an embodiment of the invention there is provided a method comprising:
receiving at an electronic device a first message from a sender intended for a user of the electronic device;
determining whether the user accesses the first message;
initiating when a positive determination is made a first process is executed by a processor forming a predetermined portion of the electronic device, the first process for monitoring at least a first characteristic of a plurality of characteristics, each characteristic relating to the user's access of the first message;
determining whether the user has finished accessing the first message; transmitting to the sender data relating to the user's accessing of the first message, the data comprising at least the first characteristic of the plurality of characteristics.

In accordance with an embodiment of the invention there is provided a method comprising:

a) receiving upon a first electronic device from a user a first message for transmission to a contact;
b) receiving upon the first electronic device a plurality of items of contact data;
c) receiving upon the first electronic device from the user time data relating to a future point in time that the first message should not be delivered before;
d) transmitting the first message and user time date to a second electronic device from the first electronic device, the second electronic device associated with a first item of contact data of the plurality of items of contact data;
e) receiving at the first electronic device an indication that the first message was not delivered to the second electronic device associated with the first item of contact data of the plurality of items of contact data;
f) automatically transmitting to another electronic device associated with another item of contact data of the plurality of items of contact data a second message and user time data; and
g) displaying on the one of the second electronic device and another electronic device to which the first message was successfully delivered an indication that the respective one of the first message and second message for the contact is available after the future point in time indicated by the user time data has passed.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
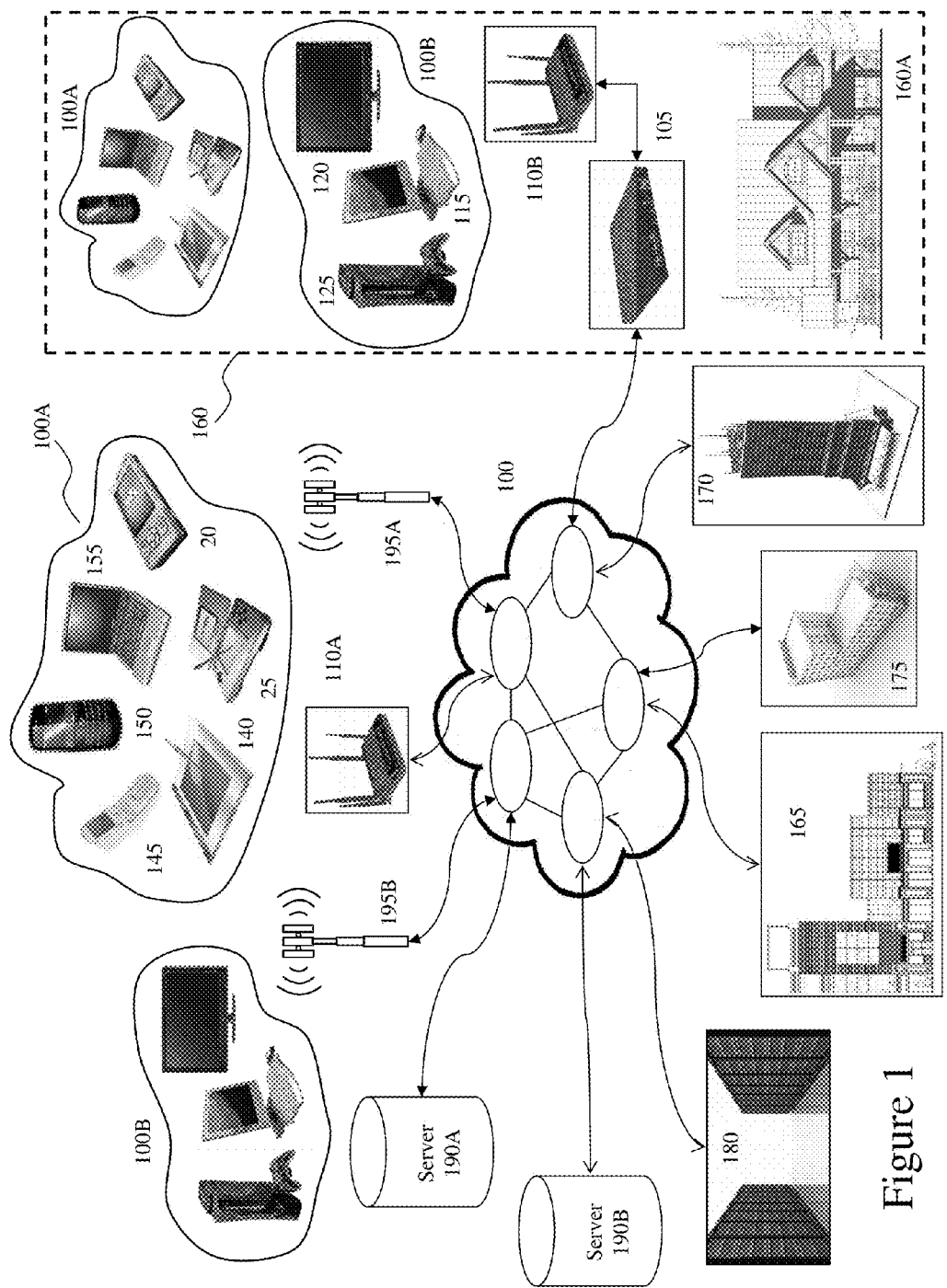
FIG. 1 depicts a network supporting communications to and from electronic devices implementing temporally delayed messaging according to embodiments of the invention.

The present invention is directed to communications systems and more particularly delayed notifications and enhanced sender feedback.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communication that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wireless device or wired device used for communication that does not require a battery or other independent form of energy for power. This includes devices, but is not limited to, Internet enable televisions, gaming systems, desktop computers, kiosks, and Internet enabled communications terminals.

A "network operator/service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

A "software system" as used as used herein may refer to, but is not limited to, a server based computer system executing a software application or software suite of applications to provide one or more features relating to the licensing, annotating, publishing, generating, rendering, encrypting, social community engagement, storing, merging, and rendering electronic content and tracking of user and social community activities of electronic content. The software system being accessed through communications from a "software application" or "software applications" and providing data including, but not limited to, electronic content to the software application. A "software application" as used as used herein may refer to, but is not limited to, an application, combination of applications, or application suite in execution upon a portable electronic device or fixed electronic device to provide one or more features relating to one or more features relating to generating, rendering, managing and controlling a user interface. The software application in its various forms may form part of the operating system, be part of an application layer, or be an additional layer between the operating system and application layer.

A "user" or "sender" as used herein and through this disclosure refers to, but is not limited to, a person or device that utilizes the software system and/or software application and as used herein may refer to a person, group, or organization that sends a message with the software system and/or software application. A "contact" or "recipient" or "receiver" as used herein and through this disclosure refers to, but is not limited to, a person or device that utilizes the software system and/or software application and as used herein may refer to a person, group, or organization that receives a message with the software system and/or software application.

Now referring to FIG. 1 there is depicted a network 100 supporting communications to and from electronic devices implementing temporally delayed messaging according to embodiments of the invention. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second wireless access points (AP) 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with residential building 160A and environment 160 within which are first and second user groups 100A and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of portable electronic devices including for example, laptop computer 155, portable gaming console 135, tablet computer 140, smartphone 150, cellular telephone 145 as well as portable multimedia player 130. Within the cell associated with second AP 110B are the second group of users 100B which may employ a variety of fixed electronic devices including for example gaming console 125, personal computer 115 and wireless/Internet enabled television 120 as well as cable modem 105.

Also connected to the network 100 are first and second APs which provide, for example, cellular GSM (Global System for Mobile Communications) telephony services as well as 3G and 4G evolved services with enhanced data transport support. Second AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First AP 195A as show provides coverage to first user group 100A and environment 160, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 and Bluetooth as well in an ad-hoc manner.

Also connected to the network 100 are retail environment 165, first commercial environment 170, and second commercial environment 175 as well as first and second servers 190A and 190B which together with others not shown for clarity, may host according to embodiments of the inventions multiple services associated with a provider of the software operating system(s) and/or software application(s) associated with the electronic device(s), a provider of the electronic device, provider of one or more aspects of wired and/or wireless communications, product databases, inventory management databases, retail pricing databases, license databases, customer databases, websites, and software applications for download to or access by fixed and portable electronic devices. First and second primary content sources 190A and 190B may also host for example other Internet services such as a search engine, financial services, third party applications and other Internet based services.

Figure 2:
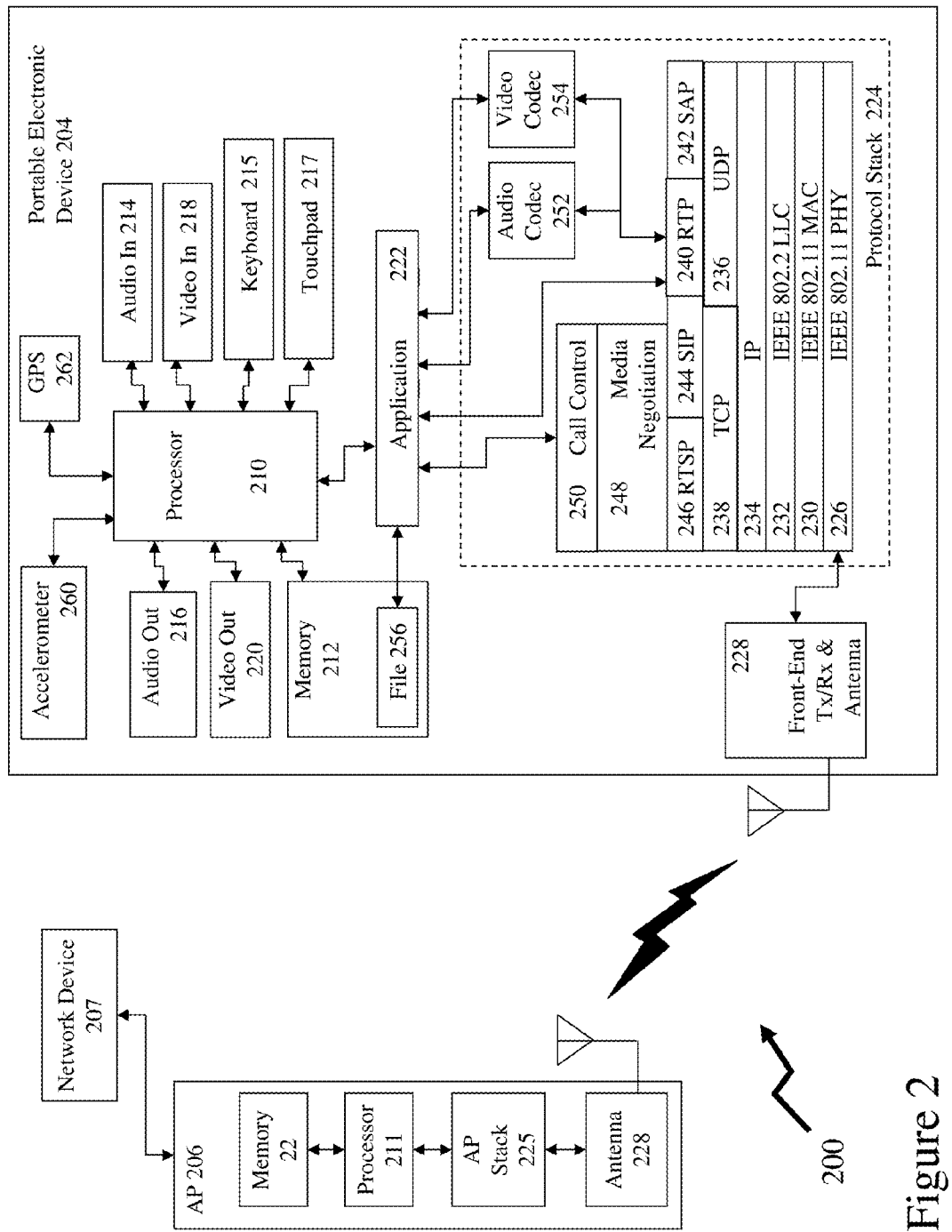
FIG. 2 depicts an electronic device and network access point supporting temporally delayed messaging according to embodiments of the invention.

FIG. 2 there is depicted an electronic device 204 and network access point 207 supporting temporally delayed messaging according to embodiments of the invention. Electronic device 204 may for example be a portable electronic device or a fixed electronic device and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first Wi-Fi AP 610, and one or more network devices 207, such as communication servers, streaming media servers, and routers for example such as first and second servers 175 and 185 respectively. Network devices 207 may be coupled to AP 206 via any combination of networks, wired, wireless and/or optical communication links such as discussed above in respect of FIG. 1. The electronic device 204 includes one or more processors 210 and a memory 212 coupled to processor(s) 210. AP 206 also includes one or more processors 211 and a memory 213 coupled to processor(s) 211. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP)

module and a Real Time Streaming Protocol (RTSP) module, media negotiation module, and a call control module.

Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Figure 3:
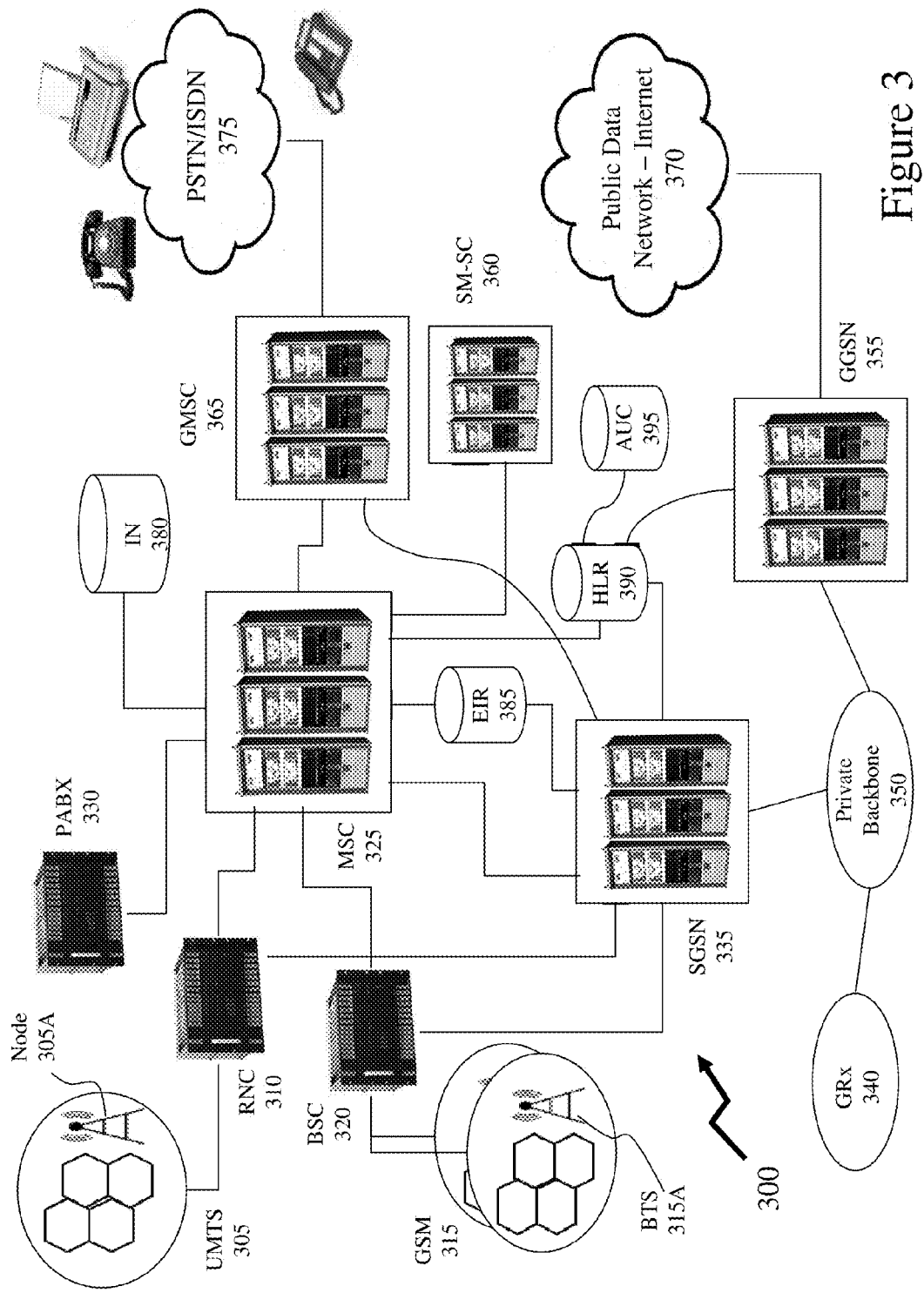
FIG. 3 depicts a network supporting communications to and from electronic devices implementing temporally delayed messaging according to embodiments of the invention.

FIG. 3 depicts a 2G/3G network 300 supporting communications to and from electronic devices implementing temporally delayed messaging according to embodiments of the invention. As depicted 2G/3G network 300 comprises multiple elements described supra in respect of FIG. 1 such as a portion of network 100, remote central exchange 180, and first and second wireless access points (AP) 195A and 195B respectively. However, 2G/3G network 300 depicts that predetermined portion of network 100 in particular and in more detail that relates to the wireless support for FEDs and PEDs. 2G/3G network 300 supports so-called 2G (second generation) wireless telephone technology standards such as GSM (Global System for Mobile Communications, originally Groupe Spécial Mobile) implemented in GSM 850 MHz, GSM 900 MHz, GSM 1800 MHz, and GSM 1900 MHz exploiting primarily TDMA (Time Division Multiple Access). 2G/3G network 300 also supports other 2G/3G (third generation) wireless telephone technology standards such as GPRS (General Packet Radio Service) and 3G standards such as UMTS (Universal Mobile Telecommunications System). Whilst 4G (fourth generation) wireless telephone technology standards are not discussed in respect of 2G/3G network 300 it would be evident to one skilled in the art that such standards as IMT-2000 and IMT-Advanced ((International Mobile Telecommunications) embodied in LTE-Advanced (Long-Term Evolution Advanced), IEEE 802.16m (WirelessMAN), 3GPP (3G Partnership Project) LTE and IEEE 802.16e (Mobile WiMAX) may also be supported through variations in the 2G/3G network 300 elements, additional infrastructure, and software/firmware for example. As depicted a 3G UMTS cell 305 is addressed by Node 305A, for example such as described supra in respect of first and second wireless access points (AP) 195A and 195B respectively in FIG. 1, providing UMTS services to users connected to the UMTS cell 305 from their FEDs/PEDs. Node 305A communicates with a Radio Network Controller (RNC) 310 which is then in communication with Mobile Switching Center (MSC) 325 and Serving GPRS Support Node (SGSN) 335.

Also depicted is GSM cell 315 addressed by Base Transceiver Station (BTS) 315A, for example such as described supra in respect of first and second wireless access points (AP) 195A and 195B respectively in FIG. 1, providing GSM services to users connected to the GSM cell 315 via their FEDs/PEDs. The BTS 315A is similarly in communication with the MSC 325 and SGSN 335 respectively as is Node 305A and these are also coupled to one another via direct communications link and Equipment Identity Register (EIR) 385 which maintains a database with records of all the mobile stations (MS) that are allowed in a network as well as a database of all equipment that is banned, e.g. because it is lost or stolen for example. Accordingly, FEDs/PEDs registering with one or other of the UMTS and/or GSM networks are registered into the EIR 385 and validated. Also coupled to MSC 325 are a Private Automatic Branch eXchange (PABX) 330, denoting an exchange serving a particular business or enterprise as opposed to one operated by a telecom carrier that operates for many businesses or for the general public, and an IN Database 380 used in conjunction with an Intelligent Network Application Part (INAP) signaling protocol used for controlling telecommunication services migrated from traditional switching points to computer based service independent platforms such as for example 0800 free phone access.

MSC 325 and SGSN 335 also communicate with Home Location Register (HLR) 390 which provides a central database containing details of each subscriber authorized to use the core network. HLR 390 also communicates with Gateway GPRS Support Node (GGSN) 355 which provides a gateway interconnection between the packet mobile networks, e.g. GPRS, GSM, and UMTS, and the public data network (Internet) 370. Accordingly, a user accessing their PED in GSM cell 315 has their communications routed through BSC 320, SGSN 335 via Private Backbone 350 to GGSN 355 and therein the Internet 370. The device and account verification for a user is performed through the polling of EIR 385 and HLR 390. Verification through HLR 390 also invokes Authentication Centre (AUC) 395 which authenticates each SIM card that attempts to connect to the network thereby allowing the HLR 390 to manage the SIM and services. This authentication also includes, typically, generation of an encryption key which is subsequently used to encrypt all wireless communications, such as voice and Simple Message Service (SMS) for example, between the mobile phone and the GSM core network.

Also connected to the Private Backbone 350 is GPRS Roaming Exchange (GRX) which acts as a hub for GPRS connections from roaming users thereby removing the need for dedicated link between each GPRS service provider and hence between multiple 2G/3G networks 300. The MSC 325 as depicted is also coupled to Short Message Service Center (SM-SC) 360 such that SMS messages send by users are stored within the SM-SC 360 which delivers each SMS message to its destination user when they are available, i.e. when they access via UMTS 305 or GSM 315 for example and their presence is determined through the verification and authentication processes with EIR 385, HLR 290, and AUC 395 which are accessible by SM-SC 360 via MSC 325. Also connected to the MSC 325 is Gateway Mobile Switching Center (GMSC) which determines which visited MSC the subscriber being called is currently located as well as routing all communications to/from PEDs and the Public Switched Telephone Network (PSTN)/Integrated Services Digital Network (ISDN) 375 which handles services including Plain Old Telephony Service (POTS) as well as simultaneous digital transmission of voice, video, data, and other network services over the traditional circuits such as copper wire. Accordingly such a 2G/3G network 300

Figure 4:
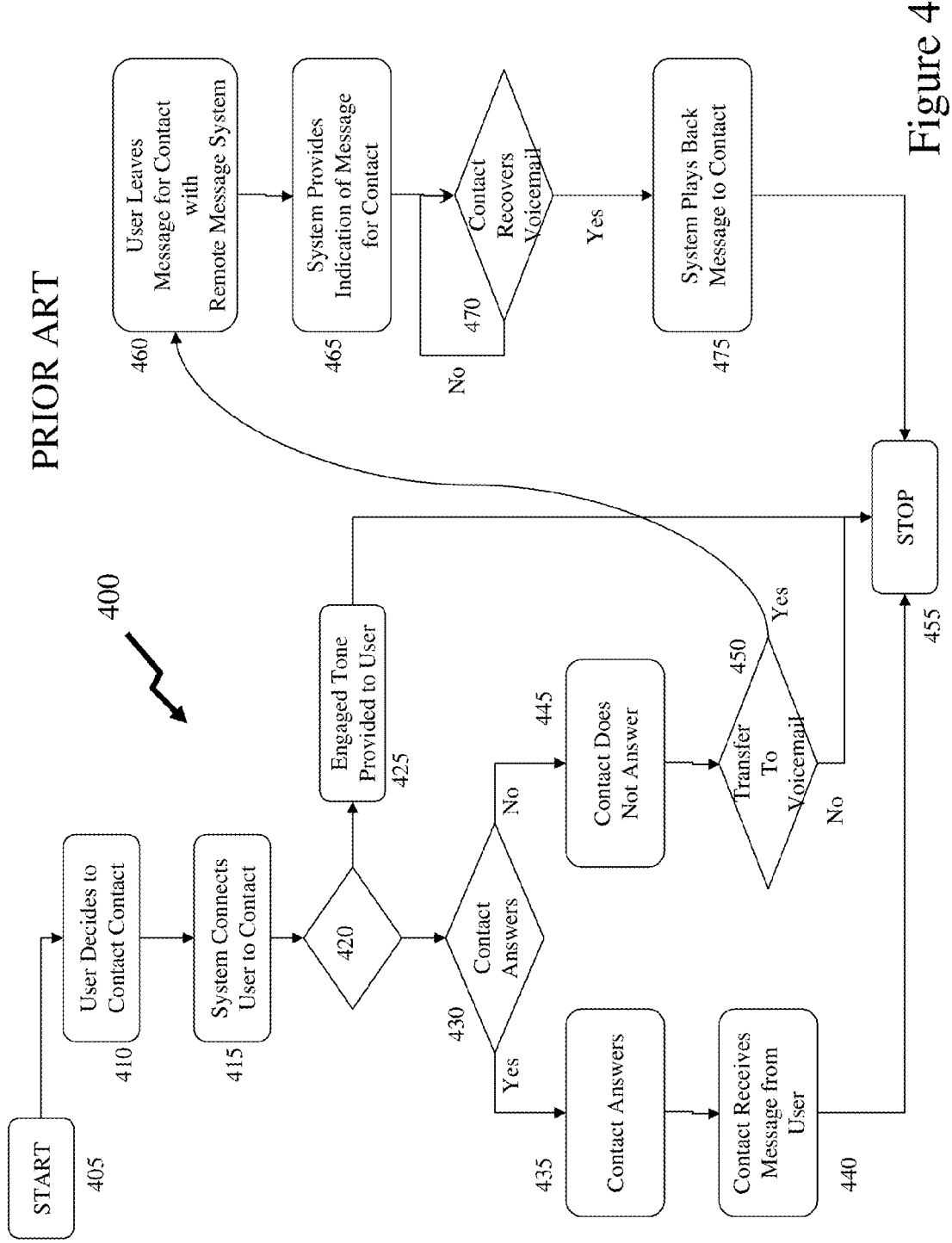
FIG. 4 depicts a process flow for a telephone message according to the prior art.

FIG. 4 depicts a process flow 400 for a telephone message according to the prior art. Process flow 400 starts at step 405 and proceeds to step 410 wherein a user decides to contact a contact and dials their phone number wherein the telecommunications system, such as described above in respect of FIGS. 1 and 3, interfaced to their device, such as for example PED 204 in FIG. 2, attempts to establish a connection to the contact's phone, which may be for example a FED on a fixed land line, a FED with wireless interface, a PED with wireless interface or a FED on a Voice-over-Internet Protocol (VOIP) service over a wired interface. In step 420 if the system is unable to establish a connection to the contact's phone, such as for example due to a capacity issue on a link within the network, a switching node capacity issue or blocked path, then the process flow proceeds to step

425 wherein the telecommunication system provides an engaged tone to the user and the flow proceeds to step 455 and stops. Alternatively at step 420 if a connection is established the process proceeds to step 430 wherein the process flow forks according to whether the contact answers or not. If the contact answers the process flow 400 proceeds to step 435 with the user and contact engaging resulting in the user's message being delivered in step 440 wherein at the completion of the conversation the process flow 400 proceeds to step 455 and stops. If the contact does not answer the process flow 400 proceeds to step 445 with the user hearing a longer ring tone followed by the process flow 400 transferring to a voicemail system wherein the user has the option to lead a voicemail wherein the process proceeds to step 460 or not leave a message wherein the process proceeds to step 455 and stops.

Where the user decides to leave a voicemail then in step 460 the user leaves the voicemail message wherein the process proceeds to step 465 and provides an indication to the user that a voicemail message is available for them. Next in step 470 the process essentially holds pending a decision of the contact to play the voicemail message wherein the process plays back the message in step 475 when the user has elected to hear the message wherein the process proceeds to step 455 and stops. It would be evident to one skilled in the art that the contact, according to the particular characteristics of the voicemail system, may delete the voicemail unheard, delete the voicemail after hearing a short initial portion, or be unaware that this particular voicemail is awaiting as there other voicemails already stored and the system merely indicates messages waiting or indicates just a number of messages waiting.

Figure 5:
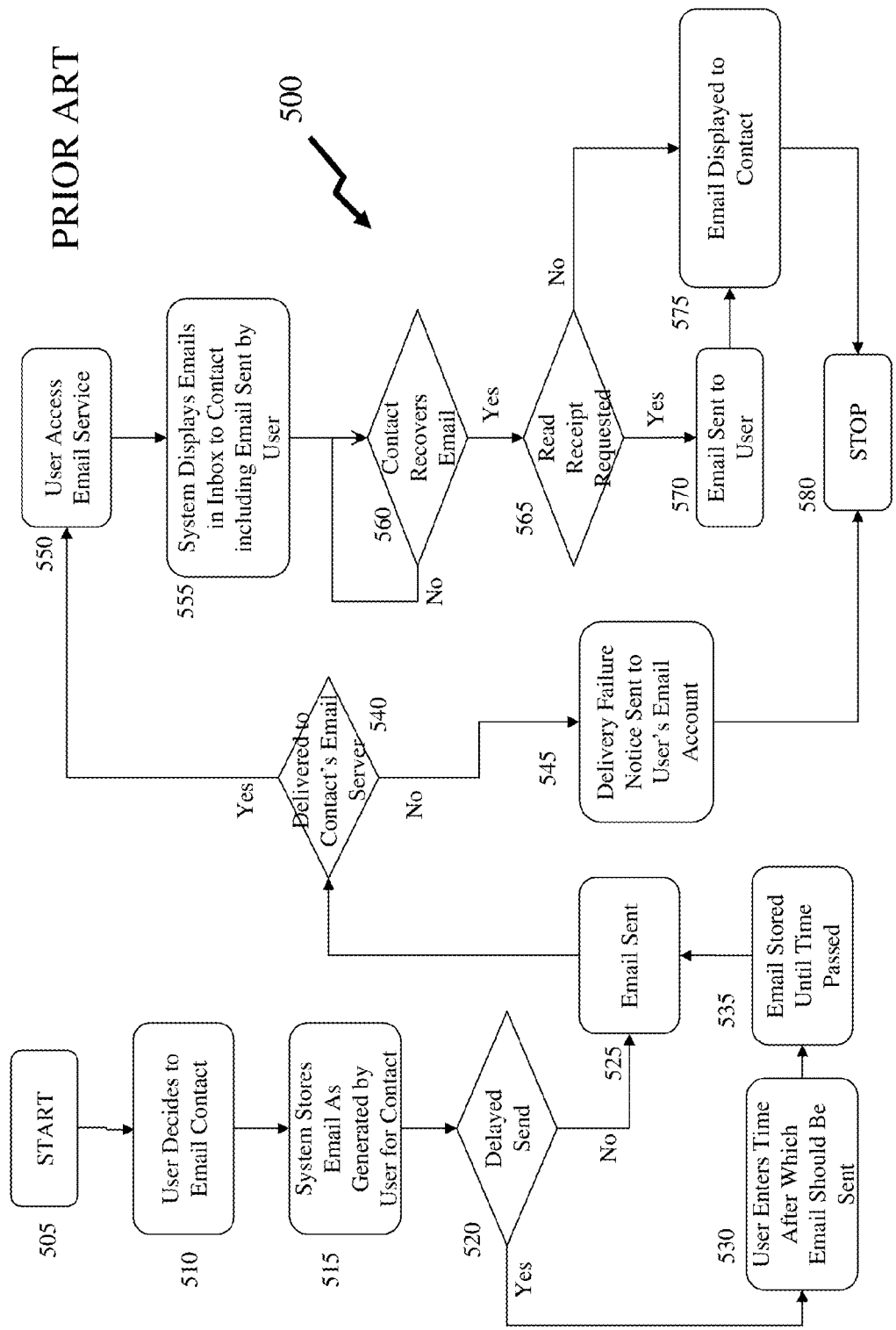
FIG. 5 depicts a process flow for an electronic mail message according to the prior art.

Now referring to FIG. 5 there is depicted a process flow 500 for an electronic mail (email) message according to the prior art. The process begins at step 505 and proceeds to step 510 wherein a user decides to send an email to a contact. Accordingly, in process step 515 the email software system stores the email generated by the user for the contact within memory. Next in step 520 the user decides whether to send the email immediately or at a later point in time wherein if the decision is to not delay the process proceeds to step 525 and the email is sent from the user's email system to the contact's email server. If the decision in step 520 is to delay sending the email then process proceeds to step 530 wherein the user enters the time after which the email should be sent from their email system. The process then proceeds to step 535 wherein the user's email system stores the email until the time selected by the user wherein it then the process proceeds to step 525 and sends the email to the email server of the contact.

In step 540 a determination is made whether the email was delivered to the contact's email system wherein a negative determination results in the process proceeding to step 545 such that a delivery failure notice to the user's email account is sent and the process proceeds to step 580 and stops. Optionally, the user's email system only provides a delivery failure notice if the user elects to select this option and accordingly in some embodiments of the invention the process would therefore proceed directly from process step 540 to process step 580. If the determination at step 540 was positive then the process proceeds to step 550 wherein the contact at a subsequent point in time accesses their email system wherein in step 555 the email system displays the InBox to the contact which would now include the email message from the user with an appropriate indication that the email message is new. The process then proceeds to step 560 which is essentially depicts a hold as no further action arises unless the contact opens the email message from the user. If the contact opens the email message from the user then the process proceeds to step 565 wherein a determination is made as to whether the user requested a read receipt for the email message. If the determination is positive then the process proceeds to step 570 wherein an email is sent to the user indicating that the contact has opened the email and the process proceeds to step 575 wherein the email is displayed to the contact, otherwise the process proceeds to step 575 directly. Accordingly the process then proceeds to step 580 and ends.

It would be evident to one skilled in the art that a contact opening an email does not automatically mean that they actually read the email and that other actions such as reading part of the email message contents, the contact deleting the email message, or the email message being transferred to a "junk" or "spam" folder may occur that result in the user not receiving notice that the contact has opened and reviewed the email or understood the message. In some email systems the contact is provided with a pop-up window indicating that a read receipt has been requested and provides options to the contact to either send such a receipt or not send it.

Accordingly, it would be beneficial in many instances where email messages and/or voicemail messages are sent containing time sensitive information, as well as other electronic communications such as SMS messages (text messages or texts), that the contact is aware as to whether the message has been received, that the pertinent information is read, and the contact can undertake other actions should they be required due to the nature of the contents of the message sent to the contact. In other situations a user may decide to send a message to a contact on the basis that they do not wish to have the contact receive the message immediately. For example, a user may decide to leave a message at a time that they know or suspect is inconvenient for the contact or at a time they do not wish to disturb the contact. Examples of such instances may include, but not limited to, middle of the night, very early in the morning and evening. Equally, the embodiments of the invention in addition to providing these benefits allow for timed messaging to be established as part of a marketing campaign or other business related activity. For example, an enterprise may establish a SMS release to a predetermined client group offering a limited time offer and verify the clients who actually opened the message within the time limit whilst allowing redemption upon a different time frame. It would be evident to one skilled in the art that other applications exist exploiting such time and verification based messaging.

Figure 6:
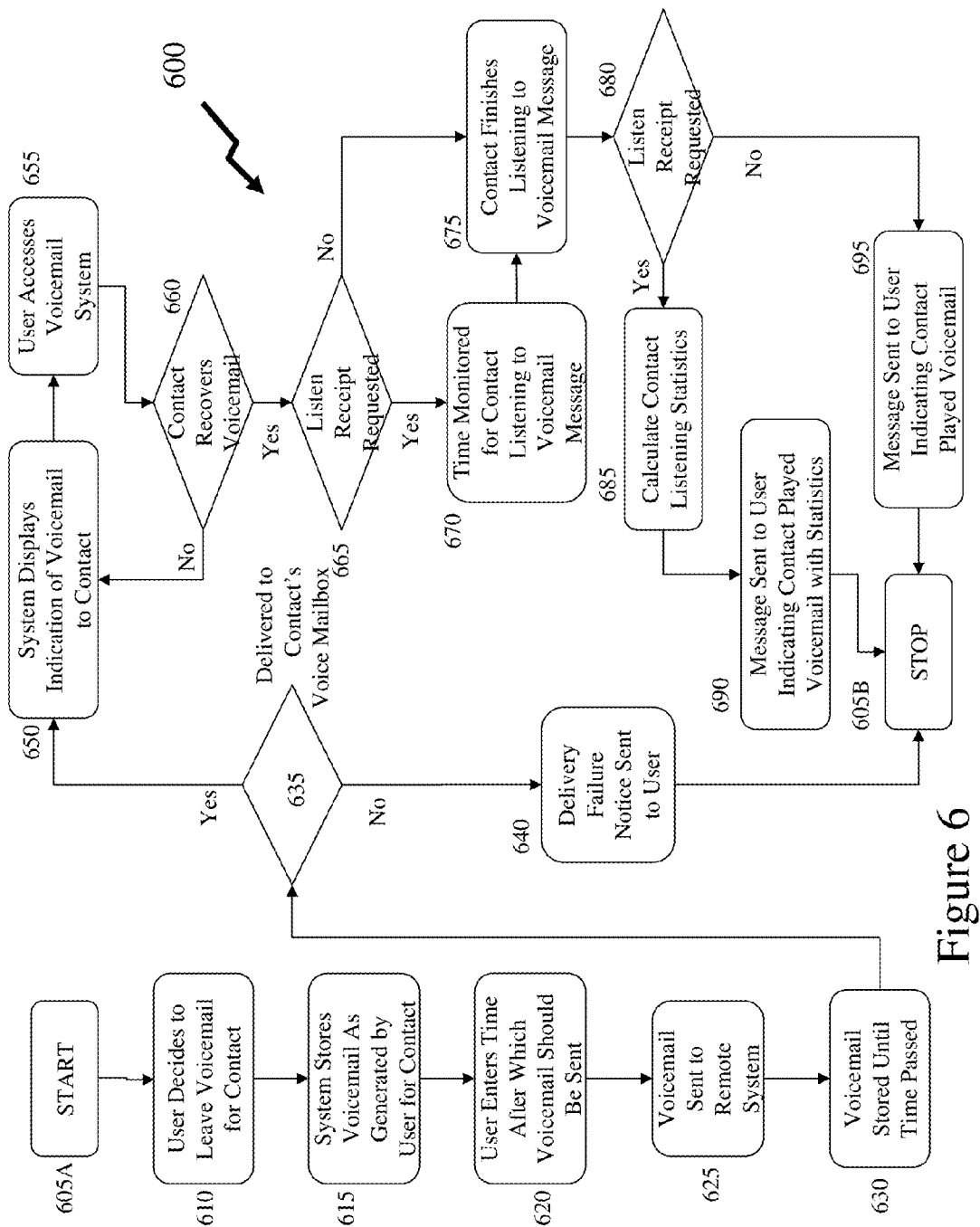
FIG. 6 depicts a process flow for a voicemail delivery system according to an embodiment of the invention.

Now referring to FIG. 6 there is depicted a process flow 600 for a voicemail delivery system according to an embodiment of the invention. The process begins at step 605A and proceeds to step 610 wherein a user decides to send a voicemail to a contact on the basis that they do not wish to have the contact receive the message immediately and also to know that the contact has received the content within the message. Accordingly, in process step 615 the voicemail software system allows the user to generate a voicemail for a contact at a contact number wherein the software system stores the voicemail generated by the user for the contact within memory. Next in step 620 the user enters the later point in time that they wish the voicemail message to be provided to the contact wherein voicemail message and timing information are transferred in step 625 from the voicemail system to a remote system wherein it is stored in step 630 until the indicated time has passed at which point it is sent to the contact number of the contact provided by the user in generating the voicemail.

The process then proceeds to step 635 wherein a determination is made as to whether the voicemail was delivered to the contact's voice inbox or not. If not, then the process flow 600 proceeds to step 640 wherein a delivery failure notice is provided to the user and the process proceeds to step 605B and stops. Upon successful delivery of the voicemail to the contact's voice inbox the process flow proceeds to step 650 and an indication of a voicemail is provided to the contact on the device or devices associated with their voice inbox. Subsequently the contact in step 655 accesses their voicemail system and a determination is made in step 660 as to whether the contact recovered the voicemail. If that determination is negative then the process loops back to step 650 so that an indication of un-played voicemails is provided to the contact. If it is positive then the process proceeds to step 665 wherein it is determined whether a read receipt for the voicemail has been requested by the user in generating the voicemail. If not then the process proceeds to step 670 wherein the contact listens to that portion of the voicemail message that they decide to and the process proceeds to a second decision in step 680 on the read receipt which results in the process proceeding to step 695 wherein a first status message is sent to the user indicating that the contact did at least "open" the voicemail.

Alternatively, the process proceeds from step 665 to step 670 wherein a timer is initiated with respect to the contact listening to the message in step 675. Accordingly, after the contact has stopped listening to the voicemail message the second decision in step 680 directs the process flow to step 685 wherein listening statistics relating to the voicemail playback by the contact are calculated. For example this may be length of message, length of message played back, and percentage of message listened to. From step 685 the process proceeds to terminate in step 605B via process step 690 where the user who sent the message is sent a message containing the listening statistics as part of the message indicating the contact played the voicemail. Accordingly, the user may ascertain how much of the message the contact listened to and based upon knowledge of the voicemail they generated whether the contact played the portion containing the important core element of their message.

Optionally, as there may be a significant delay between step 635 wherein there is a determination that the message has been delivered to the contact's voice inbox and steps 690 and 695, wherein a message is provided to the user that the contact has played the voicemail with or without call statistics, an additional message may be provided between steps 635 and 650 to indicate to the user that the message has been delivered successfully to the contact.

Figure 7:
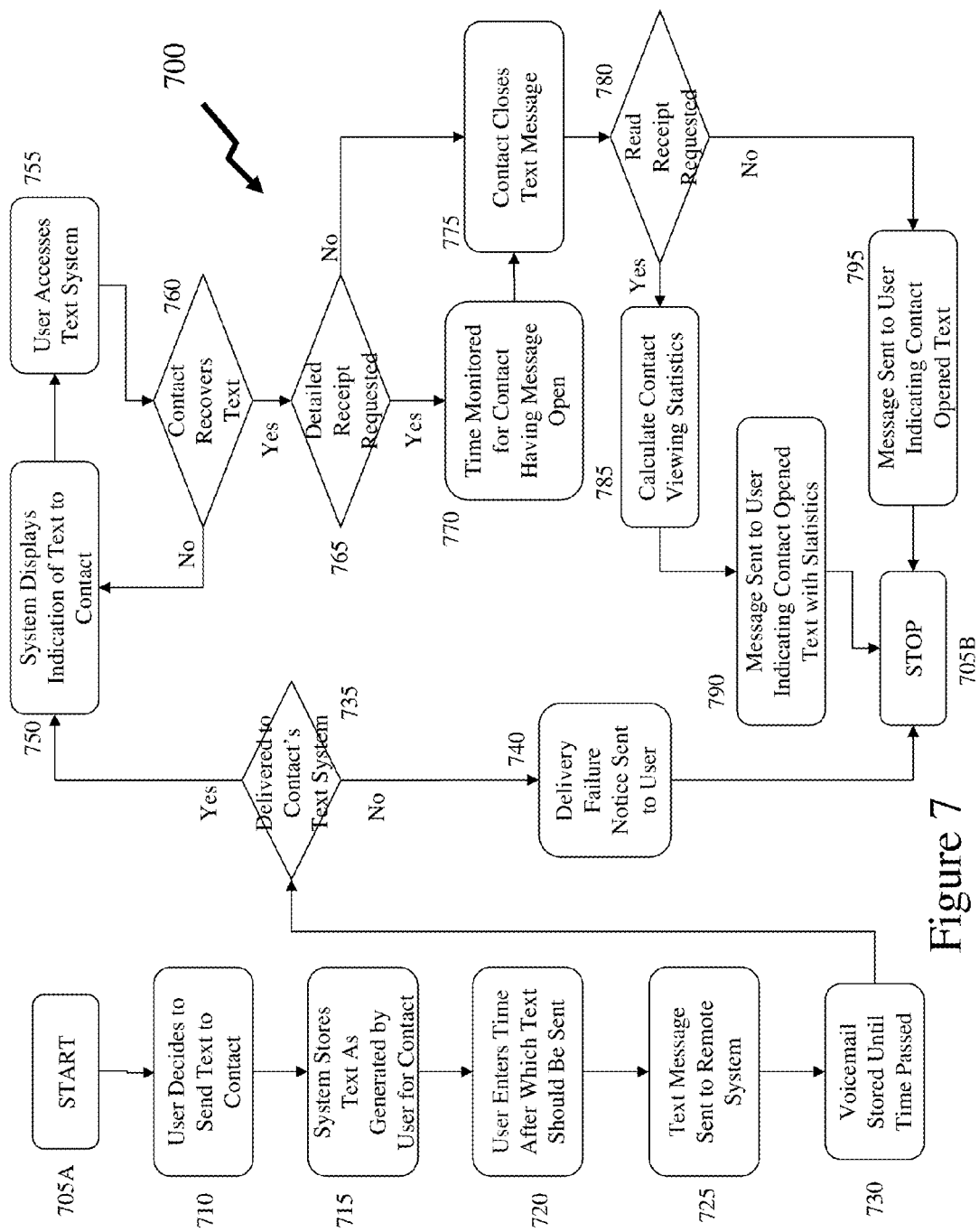
FIG. 7 depicts a process flow for a short message delivery system according to an embodiment of the invention.

Now referring to FIG. 7 there is depicted a process flow 700 for a short message (commonly known as SMS message or text) delivery system according to an embodiment of the invention. Process flow 700 comprises process steps 705A through 795 which essentially minor the process flow 600 described above in respect of FIG. 6 with the amendments that rather than a voicemail message the content is a text message, that the text message is delivered to the contact's text messaging system rather than their voicemail system and the determination of statistics is based upon how long the user has the text message open and hence assumed to be reading it. Accordingly, a read receipt request results in the user having information relating to the contact's action with the text message.

It would be evident that more complex processing of the contact's actions may be undertaken, such as for example, one where in addition to the time of the contact having the text message open it contains information relating to did the user scroll through the message, if so what portion of the message did they scroll through, did they reply to the text message, forward the text message, or delete the text message. Statistics or determinations of actions in respect of scrolling would be based for example based upon knowledge of the length of the message, did it contain image contents, what font does the contact display texts at, what are the display dimensions of the device upon which the user read the text message.

It would be evident in respect of FIGS. 6 and 7 that the read receipt request, processing, and reply messaging may be implemented with multiple levels such as none, read receipt, and read statistics wherein the "none" results in no message being delivered back to the user, "read receipt" results in just a message that the text message was opened, and "read statistics" results in a read receipt that contains statistics based upon the contact's actions once the text message has been opened.

Figure 8:
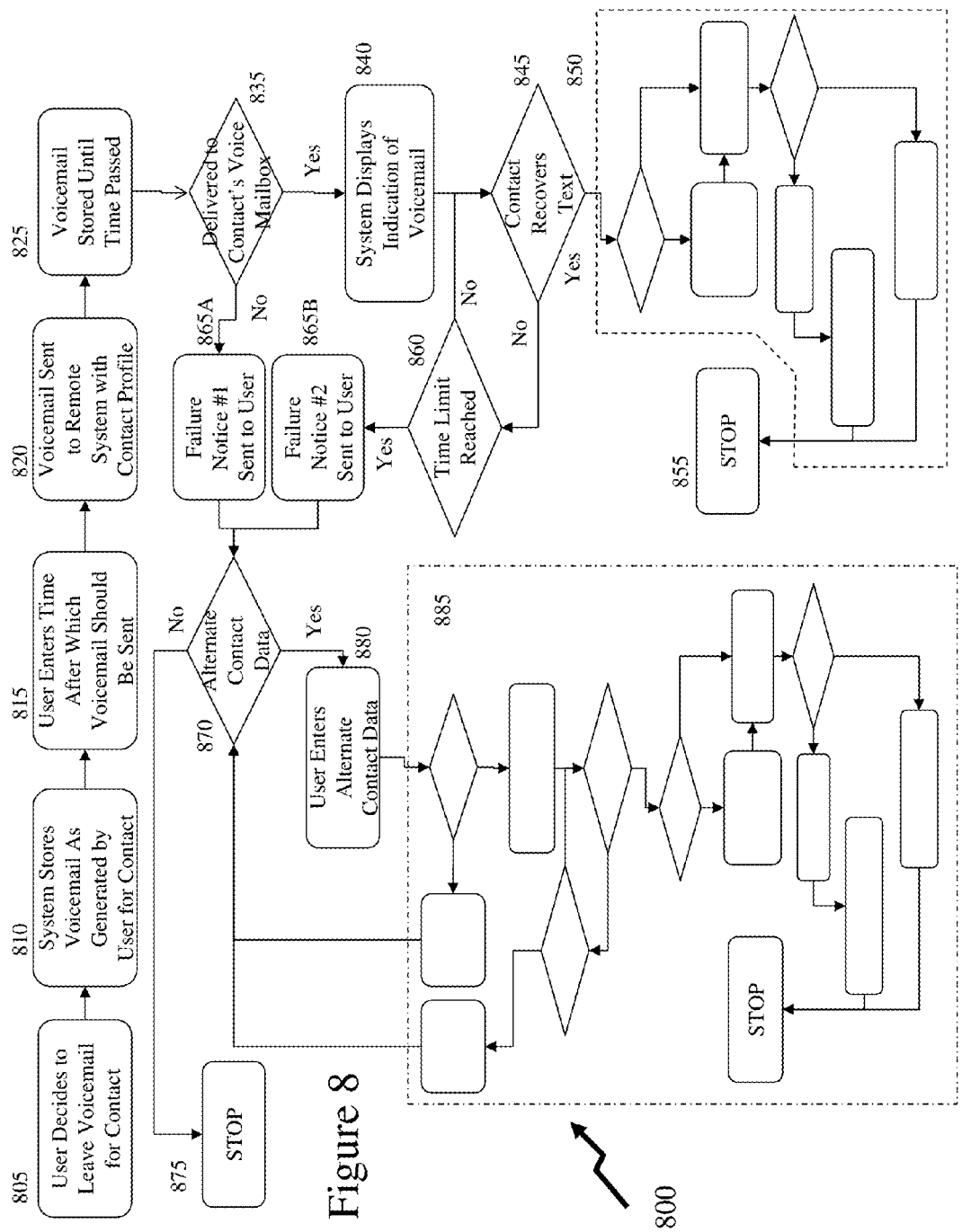
FIG. 8 depicts a process flow for a voicemail delivery system according to an embodiment of the invention allowing the user to modify contact delivery information upon a failed initial delivery.

Now referring to FIG. 8 there is depicted a process flow 800 for a voicemail delivery system according to an embodiment of the invention allowing the user to modify contact delivery information upon a failed initial delivery. Accordingly, as shown in process steps 805 through 825 the user proceeds in a manner essentially the same as that described in respect of steps 610 through 630 respectively in FIG. 6 in that the user decides to send a voicemail to a contact, enters the time after which the voicemail message should be delivered, and the voicemail is transferred to a remote system for storage until the predetermined time set by the user has elapsed. However, the user the also establishes a second time limit relating to a subsequent time after delivery wherein the user wishes to know whether the contact retrieved the message or not. Subsequently a determination is made in step 835 as to whether the voicemail message has been delivered to the contact's voice mailbox resulting in the process proceeding to step 840 if a positive determination is made and the system displays an indication of the voicemail message to the contact and proceeds to step 865A if a negative determination is made wherein a voicemail failure notice #1 is sent to the user.

If a positive determination was made then after step 840 the process determines in step 845 whether the contact has recovered the voicemail wherein if a negative determination is made the process proceeds to step 860 and a determination is made as to whether the time limit set by the user in respect of the contact recovering the voicemail message has been exceeded. A positive determination results in the process proceeding to step 865B and a voicemail failure notice #2 is sent to the user indicating that the message was delivered but the predetermined limit set by the user has expired. If in step 845 the determination was that the contact had recovered the voicemail message then the process proceeds to first sub-process block 850 which comprises a series of process steps similar to those described above in respect of FIG. 6 and process steps 670 through 695 in determining whether read receipts and contact recovery statistics are required. Upon completion of first sub-process block 850 the process proceeds to step 855 and stops.

For either of process steps 865A and 865B the process proceeds to step 870 wherein a determination is made as to whether alternate contact information is to be entered by the user. If a negative determination is made the process proceeds to step 875 and stops, otherwise a positive determination results in the process proceeding to step 880 wherein the user enters alternate contact data, such as for example changing a contact's PED number to their home telephone number. Subsequently the process flow 800 proceeds to second sub-process block 885 which comprises essentially the same process steps and logical determinations as discussed supra in respect of process steps 835 through 850, 860 and 865. A repeat failure of the contact to recover the voicemail or failure to deliver the voicemail results in the process flow 800 returning to process step 870.

It would be evident that according to another embodiment of the invention the determination in step 870 regarding alternate contact data for the contact may be made based upon information entered by the user during initial process steps 805 through 825 respectively wherein the user enters multiple alternate contact data and the process flow 800 sequentially tries each contact number for the contact. Optionally, the time limit post-delivery of each voicemail message to an alternate number may be varied.

Optionally, as there may be a significant delay between step 835, wherein there is a determination that the message has been delivered to the contact's voice inbox, and steps 860 and 865B, wherein a message is provided to the user upon failure of the contact to recover the text message within the time limit set that the contact has not played the voicemail, then an additional message may be provided between steps 835 and 840 to indicate to the user whether the message has been delivered successfully to the contact. Accordingly, the user may determine upon receipt of such a message to initiate a message via an alternate means such as described in respect of FIGS. 6-7 and FIGS. 9-11.

Figure 9:
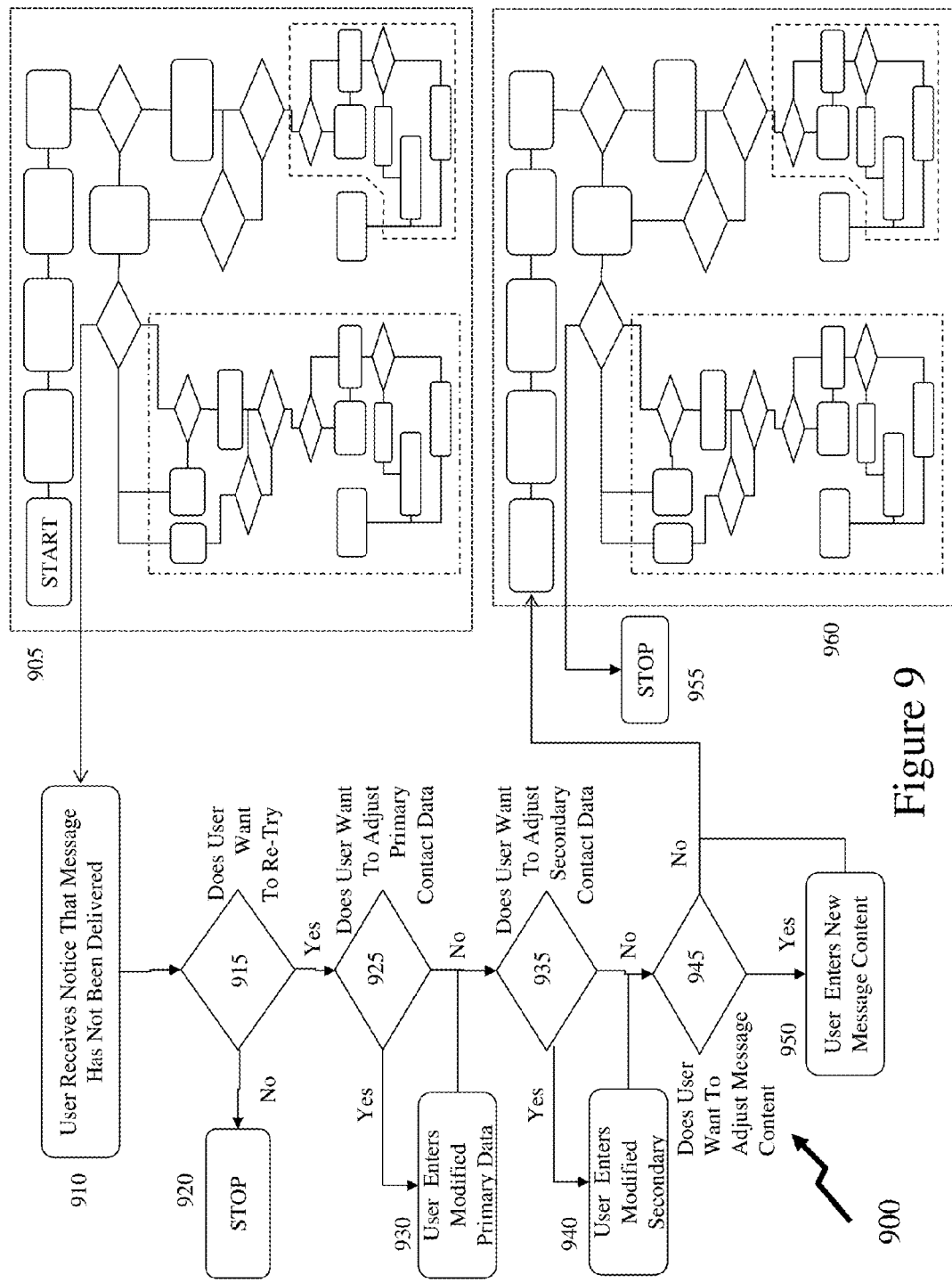
FIG. 9 depicts a process flow for a short message delivery system according to an embodiment of the invention allowing the user to modify contact delivery and message information upon a failed initial delivery.

Referring to FIG. 9 there is depicted a process flow 900 for a short message delivery system according to an embodiment of the invention allowing the user to modify contact delivery and message information upon a failed initial delivery. Process flow 900 begins with first sub-process 905 which with the exception of "Stop" process step 875 is process flow 800 described above in respect of FIG. 8. Rather instead of progressing to "Stop" process step 875 the process flow 900 proceeds to step 910 wherein the user receives notice that the message has not been delivered. At this point the process flow 900 proceeds through a series of determinations with the user in steps 915, 925, 935, and 945 wherein the user is given options to re-try without any modifications, modify primary contact data, modify secondary contact data and modify the message respectively. Process steps 925, 935 and 945 upon positive determinations result in the process flow proceeding to steps 930, 940, and 950 respectively wherein the user may enter modifications to the primary contact data, secondary contact data and the message respectively. Accordingly either directly from step 945 or step 950 process flow 900 proceeds to second sub-process 960 which is similar to first sub-process 905, and accordingly process flow 800 described above in respect of FIG. 8 with the exception of "Stop" process step 875 which is now depicted as process step 955.

Accordingly, a user may seek delayed delivery of an initial voicemail but upon failure of the initial voicemail the user is provided with the ability to re-send to alternate primary contact data, e.g. first delivery address for the message, adjust secondary contact data which if none was provided initially allows for it to be added and adjust the content of the message. For example a user may send a colleague a message regarding a meeting the next morning but does not wish to disturb the colleagues evening and hence establishes a delay such that the message will be delivered at 7 am to the colleagues PED with a time limit of 45 minutes. Whilst the message is delivered the colleague does not retrieve it such that the user upon receiving the notification to this effect modifies the primary data to ring the colleague's residential phone intending this to result in the message now being communicated to the colleague.

Figure 10:
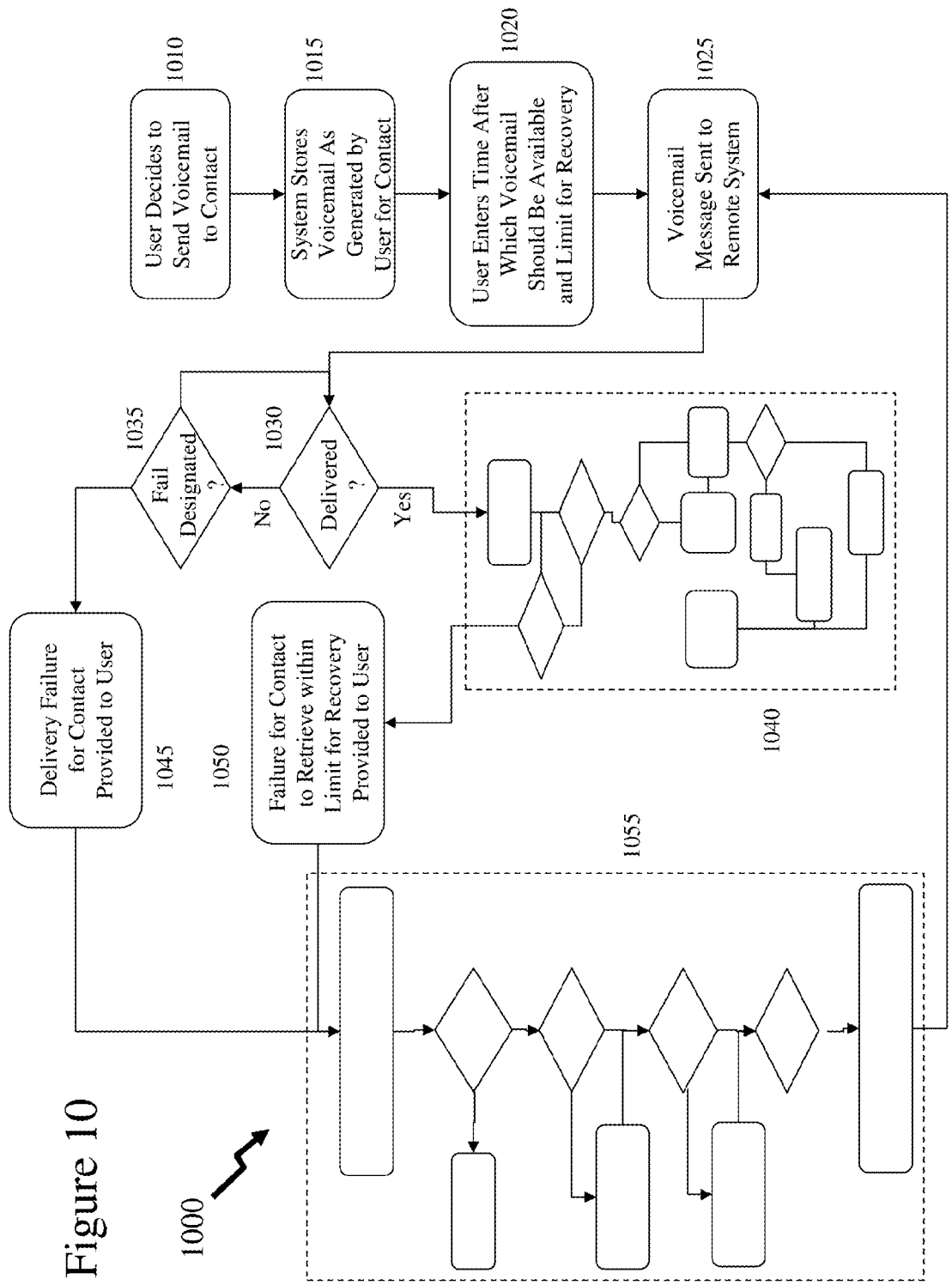
FIG. 10 depicts a process flow for a voicemail delivery system according to an embodiment of the invention allowing the user to modify contact delivery information upon a failed initial delivery or delayed recovery by the receiving contact.

Now referring to FIG. 10 there is depicted a process flow 1000 for a voicemail delivery system according to an embodiment of the invention allowing the user to modify contact delivery information upon a failed initial delivery or delayed recovery by the receiving contact. As depicted process steps 1010 through 1025 provide a sequence wherein a user elects to send a voicemail to a contact, generates the voicemail, enters data relating to when the voicemail should be delivered and time limit for recovery, after which the voicemail message is sent to the remote system. From process step 1025 process flow 1000 proceeds to step 1030 wherein a determination as to the delivery of the voicemail is determined. A positive determination results in process flow 1000 proceeding to first sub-process 1040, which is the same as second sub-process block 885 in process flow 800 as described supra in respect of FIG. 8, thereby providing for monitoring of contact's playback and determination of voicemail playback statistics. Accordingly, first sub-process 1040 either stops internally with a stop process step as discussed previously or process flow 1000 proceeds to step 1050 wherein the contact failed to retrieve a successfully delivered voicemail within the predetermined time limit set by the user and a message is delivered to the user to this effect. Process flow 1000 then proceeds to second sub-process 1055 which depicts an equivalent process sequence as process steps 910 to 950 respectively as described supra in respect of FIG. 9. Second sub-process 1055 either stops internally or process flow 1000 returns to process step 1025 with the delivery of a modified voicemail message to the contact.

If the determination in process step 1030 was that the message had not been delivered then the process proceeds to step 1035 wherein it is determined whether the delivery failed or whether another issue exists in which case the process loops back to step 1030. A verified failed delivery results in process flow 1000 proceeding to step 1045 wherein the user is notified of the failure and the process then proceeds to second sub-process 1055 as described supra.

Figure 11:
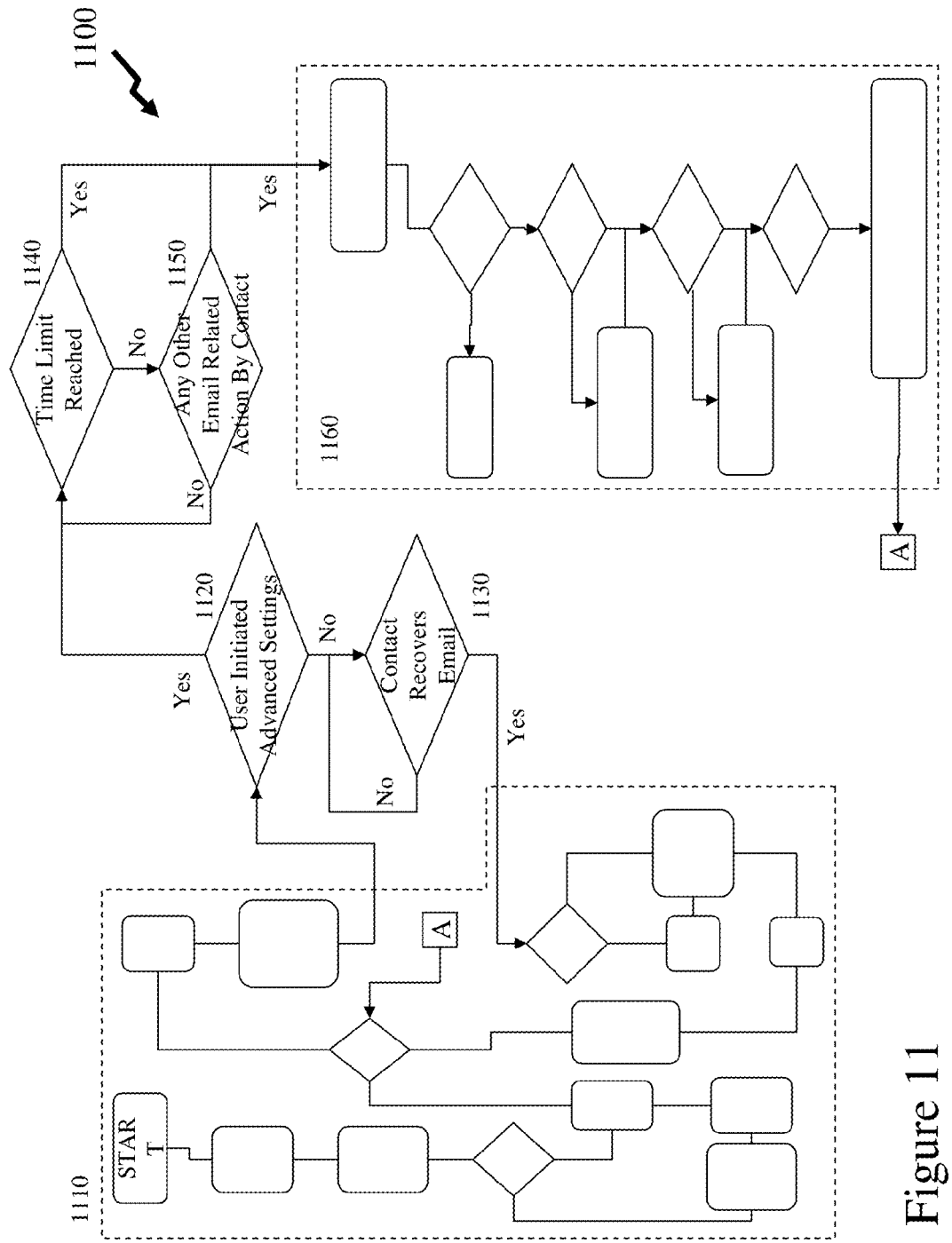
FIG. 11 depicts a process flow for an electronic mail message system according to an embodiment of the invention allowing the user to perform actions based upon failure of recipient to open electronic mail message or review portion of contents.

FIG. 11 depicts an electronic mail message system according to an embodiment of the invention allowing the user to perform actions based upon failure of recipient to open electronic mail message or review portion contents. According the process begins within a start step in first sub-process 1110 which provides a process flow comparable to that described in respect of process flow 500 except that an additional link "A" is provided to the equivalent process step as step 540 and that process step 560 relating to the loop for contact recovery of the email is now replaced by process steps 1120 and 1130. Accordingly, first sub-process 1110 proceeds with a user generating an email for a contact and upon its successful delivery to the contact and display to the contact in their email inbox wherein the process proceeds to step 1120 wherein the process determines whether the user has initiated advanced settings or not. A negative determination results in the process flow 1110 proceeding to step 1130 wherein the process loops checking for whether the contact access the email wherein a positive determination returns process flow 1100 to first sub-process 1110 at the equivalent step to step 565 in process flow 500.

If a positive determination in step 1120 is made the process proceeds to step 1140 wherein the process loops through process step 1150 until either the time limit is reached or the contact makes another email related action, such as deleting it for example, wherein in either even the process proceeds to second sub-flow 1160 which is equivalent to second sub-process 1055 in FIG. 10 which depicts an equivalent process sequence as process steps 910 to 950 respectively as described supra in respect of FIG. 9.

It would be evident to one skilled in the art that within embodiments of the invention the generation of for example a voicemail may be undertaken as a process wherein the user generates a written message which is then converted to a voicemail message or that a voice message may be converted to a text, SMS, or email message for example according to preferences of the user. It would be further evident that such conversions may also occur at the contact side as a result of preferences of the contact. Such occurrences may for example allow for a disability of the user and/or contact or relate to aspects of the FED/PED upon which the communication is sent and/or received.

It would be evident that the storage of messages prior to delivery to the user may be performed on the contacts PED/FED such that delivery to their PED/FED is achieved but actually delivery notification to the contact is not performed until the allotted time set by the user.

It would be evident to one skilled in the art that the embodiments of the invention relate to systems providing for the generation and reception of messages in one or more formats, including but not limited to, email, SMS, text, and voicemail. Such embodiments of the invention are essentially independent of the network over which the messages are communication and hence may include one or more additional wireless or wired interfaces/elements operating according to one or more standards which may be selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, Power line communication (PLC), and Cable TV. Wired interfaces may be further one or more of twisted-pair copper, coaxial cable, singlemode fiber optic and multimode fiber optic.

It would be evident therefore be evident that embodiments of the invention may be implemented as part of existing or future communications systems and the software upon their associated PEDs/FEDs or that they be implemented as one or more standard alone software applications that may also be employed on electronic devices. It would also be evident that such software applications installed and/or operating on the electronic devices may communicate to a software system in execution upon remote servers such that communications relating to applications for the user are parsed by the remote server based software system so that notifications can be provided to the user.

It would be evident to one skilled in the art that the concepts discussed above in respect of software applications and communications whilst being primarily considered from the viewpoints of tablet computers, smart phones, laptop computers and similar communications based portable electronic devices that the underlying principles may be applied to a wider variety of devices including for example portable gaming consoles, such as Nintendo DS and Sony PSP; portable music players such as Apple iPod, and eReaders such as Kobo, Kindle, and Sony Reader. It would also be evident that whilst the embodiments of the invention have been described with respect to a standalone application that they may also be employed within software applications that form part of an operating environment such as Windows, Mac OS, Linux and Android for example.

It would be further evident that the messages to/from the receiver's PED/FED and from/to the sender's PED/FED may be transmitted through a remote server executing a software system and/or software application according to an embodiment of the invention wherein activities such as determining characteristics of the message send to the contact, receiving data relating to the contact's accessing of the message, and determining analytics of the message relating to the contact's access of the message may be performed by the remote system rather than at the end point PEDs/FEDs of the user and contact.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
a) establishing upon a first electronic device comprising at least a microprocessor connected to a network a first message for transmission to another electronic device associated with a contact;
b) establishing upon the first electronic device a plurality of items of contact data, each item of contact data relating to a communications address associated with the contact;
c) establishing upon the first electronic device first time data relating to a future point in time that the first message should not be delivered before;
d) transmitting the first message and time data to a second electronic device connected to the network from the first electronic device, the second electronic device associated with a first item of contact data of the plurality of items of contact data;
e) receiving upon the first electronic device from the network a first indication, the first indication relating to delivery of the first message to the second electronic device associated with the first item of contact data of the plurality of items of contact data;
f) automatically transmitting upon receipt of a first indication indicating non-delivery a second message and the time data to another electronic device connected to the network, the another electronic device associated with another item of contact data of the plurality of items of contact data; and
g) only providing an indication on either the second electronic device when the first message was successfully delivered or on the another electronic device when the second message was successfully delivered, wherein
the indication is only available after the future point in time established by the first time data has passed.

2. The method according to claim 1, wherein,
establishing time data in step (c) further comprises receiving second time data relating to a subsequent period of time after the future point in time; and
automatically transmitting upon receipt of a second indication from the network a second message and the time data to the another electronic device connected to the network, the second indication indicating delivery of the first message and that the first message has not been opened within the subsequent period of time determined by the second time data after the future point in time established by the first time data.

3. The method according to claim 1, wherein
the first and second messages are the same.

4. The method according to claim 1, wherein
step (f) further comprises providing the user with an option to modify at least one of the first message to generate the second message, generate the second message, modify the another item of contact data of the plurality of items of contact data, and add an item of contact data to the plurality of contact items.

5. The method according to claim 1, wherein
steps (e) through (g) are repeated for each item of contact data until the first message is successfully delivered to an electronic device associated with one of the items of contact data.

6. The method according to claim 1 wherein,
step (c) further comprises receiving second time data relating to a subsequent period of time after the future point in time; and
steps (e) through (g) are repeated for each item of contact data until an indication is received that a message has not only been successfully delivered to an electronic device associated with one of the items of contact data but that the message has been opened within the subsequent period of time after the future point in time established by the second time data.

7. The method according to claim 1, wherein
steps (a) through (f) performed on the first electronic device are performed on a remote server;
the information in steps (a) through (c) provided by the user are communicated to the remote server from a first software application in execution on an electronic device associated with the user; and
the indication that the respective one of the first message and second message for the contact is available after the future point in time indicated by the user time data has passed is provided by a second software application in execution on an electronic device associated with the contact.

8. Computer readable and executable instructions stored within a plurality of non-transitory non-volatile memories for execution by microprocessors associated with first and second electronic devices, the computer readable and executable instructions relating to a process comprising:
a) establishing upon a first electronic device comprising at least a microprocessor connected to a network a first message for transmission to another electronic device associated with a contact;
b) establishing upon the first electronic device a plurality of items of contact data, each item of contact data relating to a communications address associated with the contact;
c) establishing upon the first electronic device first time data relating to a future point in time that the first message should not be delivered before;
d) transmitting the first message and time data to a second electronic device connected to the network from the first electronic device, the second electronic device associated with a first item of contact data of the plurality of items of contact data;
e) receiving upon the first electronic device from the network a first indication, the first indication relating to delivery of the first message to the second electronic device associated with the first item of contact data of the plurality of items of contact data;
f) automatically transmitting upon receipt of a first indication indicating non-delivery a second message and the time data to another electronic device connected to the network, the another electronic device associated with another item of contact data of the plurality of items of contact data; and
g) only providing an indication on either the second electronic device when the first message was successfully delivered or on the another electronic device when the second message was successfully delivered, wherein
the indication is only available after the future point in time established by the first time data has passed.

9. The computer readable and executable instructions according to claim 8, wherein
establishing time data in step (c) further comprises receiving second time data relating to a subsequent period of time after the future point in time; and
automatically transmitting upon receipt of a second indication from the network a second message and the time data to the another electronic device connected to the network, the second indication indicating delivery of the first message and that the first message has not been opened within the subsequent period of time determined by the second time data after the future point in time established by the first time data.

10. The computer readable and executable instructions according to claim 8, wherein the first and second messages are the same.

11. The computer readable and executable instructions according to claim 8, wherein step (f) further comprises providing the user with an option to modify at least one of the first message to generate the second message, generate the second message, modify the another item of contact data of the plurality of items of contact data, and add an item of contact data to the plurality of contact items.

12. The computer readable and executable instructions according to claim 8, wherein the process steps (e) through (g) are repeated for each item of contact data until the first message is successfully delivered to an electronic device associated with one of the items of contact data.

13. The computer readable and executable instructions according to claim 8, wherein
step (c) further comprises receiving second time data relating to a subsequent period of time after the future point in time; and
steps (e) through (g) are repeated for each item of contact data until an indication is received that a message has not only been successfully delivered to an electronic device associated with one of the items of contact data but that the message has been opened within the subsequent period of time after the future point in time established by the second time data.

14. The computer readable and executable instructions according to claim 8, wherein
steps (a) through (f) performed on the first electronic device are performed on a remote server;

the information in steps (a) through (c) provided by the user are communicated to the remote server from a first software application in execution on an electronic device associated with the user; and the indication that the respective one of the first message and second message for the contact is available after the future point in time indicated by the user time data has passed is provided by a second software application in execution on an electronic device associated with the contact.

15. The method according to claim 1, wherein receiving upon the first electronic device from the network a first indication relating to delivery of the first message further comprises receiving statistics relating to the opening of the first message by a recipient of the first message.

16. The method according to claim 1, wherein the first message is in a first format, the first format selected from the group comprising voice, text, short message service, audio-visual, and electronic mail.

17. The method according to claim 1, wherein:

the first message is generated in a first format by a user associated with the first electronic device;

the first message is transmitted in a second format by the first electronic device via the network to the second electronic device;

the first message is presented to a recipient associated with the second electronic device in a third format; and the first message is transmitted to the second electronic device via the network from the first electronic device in a third format, wherein the first format is established in dependence upon at least one of a preference of the user and an aspect of the first electronic device;

the second format is established in dependence of at least one of a preference of the user, an aspect of the first electronic device, and an aspect of the second electronic device; and the third format is established in dependence upon at least one of a preference of the recipient and an aspect of the second electronic device.

18. The computer readable and executable instructions according to claim 8, wherein receiving upon the first electronic device from the network a first indication relating to delivery of the first message further comprises receiving statistics relating to the opening of the first message by a recipient of the first message.

19. The computer readable and executable instructions according to claim 8, wherein:

the first message is generated in a first format by a user associated with the first electronic device;

the first message is transmitted in a second format by the first electronic device via the network to the second electronic device;

the first message is presented to a recipient associated with the second electronic device in a third format; and the first message is transmitted to the second electronic device via the network from the first electronic device in a third format, wherein the first format is established in dependence upon at least one of a preference of the user and an aspect of the first electronic device;

the second format is established in dependence of at least one of a preference of the user, an aspect of the first electronic device, and an aspect of the second electronic device; and the third format is established in dependence upon at least one of a preference of the recipient and an aspect of the second electronic device.

* * * * *